United States Patent
Dieduksman et al.

(10) Patent No.: US 10,082,230 B2
(45) Date of Patent: Sep. 25, 2018

(54) CORRUGATED TUBE FOR PROTECTING A CABLE, FASTENER FOR COUPLING A HOUSING ON THE CORRUGATED TUBE AND SEAL ELEMENT FOR SEALING THE CORRUGATED TUBE AGAINST THE HOUSING

(71) Applicant: TE Connectivity Nederland BV, s'Hertogenbosch (NL)

(72) Inventors: Andreas Winandus Dieduksman, s'Hertogenbosch (NL); Tekke Drijfhout, Nistelrode (NL)

(73) Assignee: TE Connectivity Nederland BV, s'Hertogenbosch (NL)

( * ) Notice: Subject to any disclaimer, the term of this patent is extended or adjusted under 35 U.S.C. 154(b) by 118 days.

(21) Appl. No.: 14/749,156

(22) Filed: Jun. 24, 2015

(65) Prior Publication Data

US 2015/0369406 A1  Dec. 24, 2015

(30) Foreign Application Priority Data

Jun. 24, 2014 (EP) .................................. 14173770

(51) Int. Cl.
   *F16L 21/06* (2006.01)
   *H02G 3/04* (2006.01)

(52) U.S. Cl.
   CPC ............ *F16L 21/06* (2013.01); *H02G 3/0468* (2013.01)

(58) Field of Classification Search
   USPC ......................................... 285/305, 903, 319
   See application file for complete search history.

(56) References Cited

U.S. PATENT DOCUMENTS

| | | | | |
|---|---|---|---|---|
| 3,551,007 A * | 12/1970 | Martin | ................... | F16L 21/005 285/133.11 |
| 3,727,953 A * | 4/1973 | Martin | ................... | F16L 21/005 285/148.23 |
| 4,368,904 A * | 1/1983 | Lanz | .................... | F16L 25/0045 285/149.1 |
| 4,674,775 A * | 6/1987 | Tajima | ................ | F16L 19/0206 285/330 |
| 4,801,158 A * | 1/1989 | Gomi | ................... | F16L 25/0036 285/330 |
| 5,112,086 A * | 5/1992 | Gruber | ................ | F16L 25/0045 285/315 |
| 5,407,236 A * | 4/1995 | Schwarz | ............. | F16L 25/0045 285/23 |
| 6,254,145 B1 * | 7/2001 | Schwarz | ............. | F16L 25/0045 285/319 |
| 6,550,816 B1 * | 4/2003 | Sorkin | ...................... | E04C 5/10 285/139.1 |
| 6,764,105 B1 * | 7/2004 | Sorkin | ...................... | E04C 5/10 285/230 |
| 7,677,610 B2 * | 3/2010 | Schwarz | ............. | F16L 25/0045 285/319 |
| 2002/0083991 A1 * | 7/2002 | Sorkin | ...................... | E04C 5/10 138/121 |

(Continued)

*Primary Examiner* — Aaron M Dunwoody
(74) *Attorney, Agent, or Firm* — Barley Snyder

(57) ABSTRACT

A coupling assembly has a tube, a seal, and a fastener. The tube has an outer surface with a plurality of corrugations and a reinforcing member. The seal is positioned on a first end of the tube. The releasable fastener is positioned on the first end of the tube.

18 Claims, 8 Drawing Sheets

(56) References Cited

U.S. PATENT DOCUMENTS

| | | | |
|---|---|---|---|
| 2004/0080160 A1* | 4/2004 | Rief | E04H 4/1654 |
| | | | 285/276 |
| 2004/0232694 A1* | 11/2004 | Martin | F16L 25/0045 |
| | | | 285/305 |
| 2006/0208485 A1* | 9/2006 | Discher | F16L 25/0045 |
| | | | 285/319 |
| 2007/0246936 A1* | 10/2007 | Jeltsch | F16L 25/0045 |
| | | | 285/319 |
| 2011/0148100 A1* | 6/2011 | Lei | F16L 25/0045 |
| | | | 285/305 |

\* cited by examiner

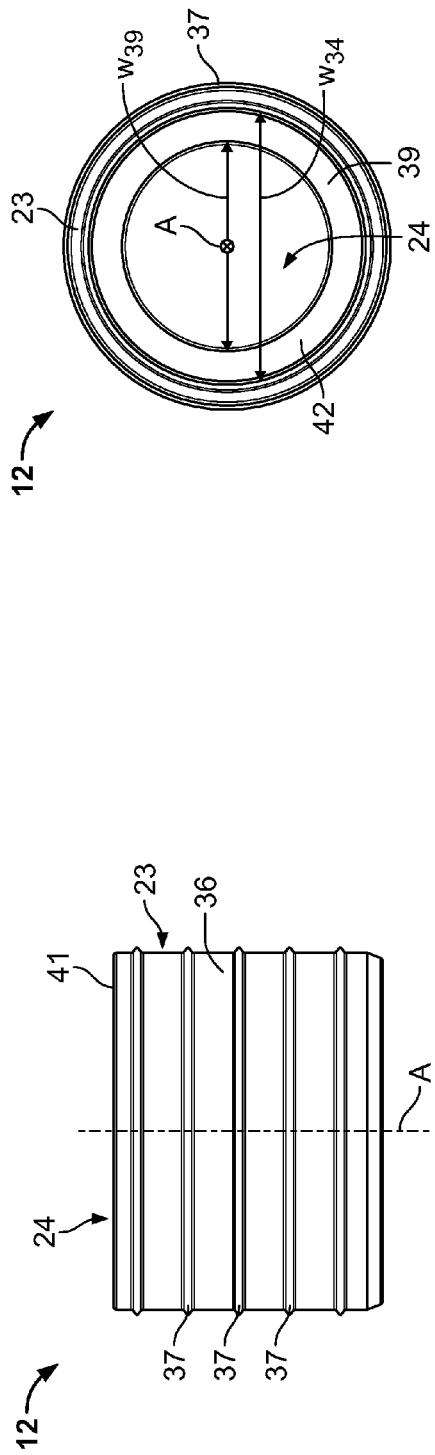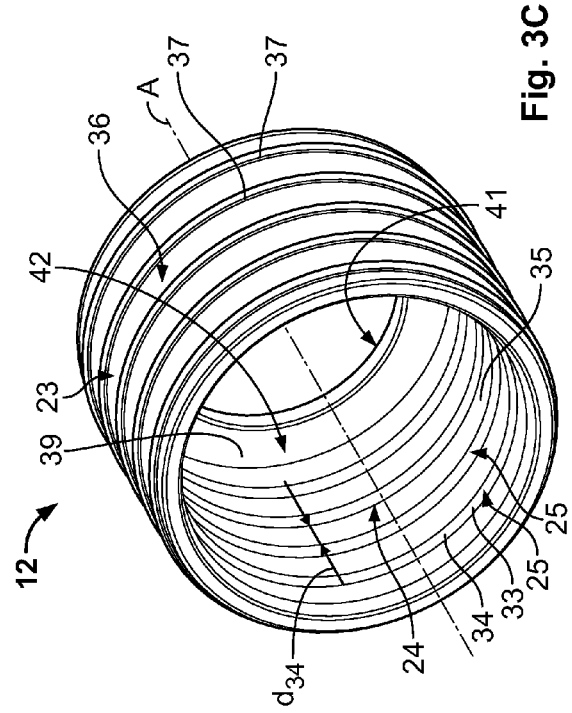

CORRUGATED TUBE FOR PROTECTING A CABLE, FASTENER FOR COUPLING A HOUSING ON THE CORRUGATED TUBE AND SEAL ELEMENT FOR SEALING THE CORRUGATED TUBE AGAINST THE HOUSING

CROSS-REFERENCE TO RELATED APPLICATION

This application claims priority under 35 U.S.C. § 119 (a)-(d) or (f) to European Patent Application No. 1417377.0, dated Jun. 24, 2014.

FIELD OF THE INVENTION

The invention is generally related to an electrical connector, and, more specifically, to a sealed electrical connector.

BACKGROUND

Connectors are conventionally used to protect cables and cable connectors against harmful environmental impacts, such as shock, dirt, strain, moisture or other corrosive substances. Such connectors are fastened on a protective tube, in which a part of the cable, such as a data or power transmission line, is received. A connector housing is fastened to the protective tube and is used to attach an end of the protective tube to various field installation devices, such as a data transmitter. An opposite end of the protective tube may likewise be fastened to another connector housing, or with an adapter housing which is fixed on the cable.

Commonly, an attachment point where the connector/adapter housing is connected to the tube, is prone to water or other contaminants infiltration. Such infiltration can enter the tube, damaging the cable positioned inside. Further, a firm connection between the tube and the connector/adapter housing, in particular in the longitudinal direction of the tube, is required to withstand hazardous environments. However, strain along the longitudinal direction of the tube often results in damage to the connector or the cable. This damage is often attributed to undesired elongation of the corrugated tube in the longitudinal direction or detachment of the housing from the tube.

Improvements in the sealing and fastening of housings on corrugated tubes, as well as the robustness of a tube connection, would be beneficial.

SUMMARY

A coupling assembly has a tube, a seal, and a fastener. The tube has an outer surface with a plurality of corrugations and a reinforcing member. The seal is positioned on a first end of the tube. The releasable fastener is positioned on the first end of the tube.

BRIEF DESCRIPTION OF THE DRAWINGS

The invention will now be described by way of example, with reference to the accompanying Figures, of which:

FIG. 3A is an elevation view of a seal;
FIG. 3B is a top view of the seal;
FIG. 3C is a perspective view of the seal.

DETAILED DESCRIPTION OF THE PREFERRED EMBODIMENTS

Figure 1:
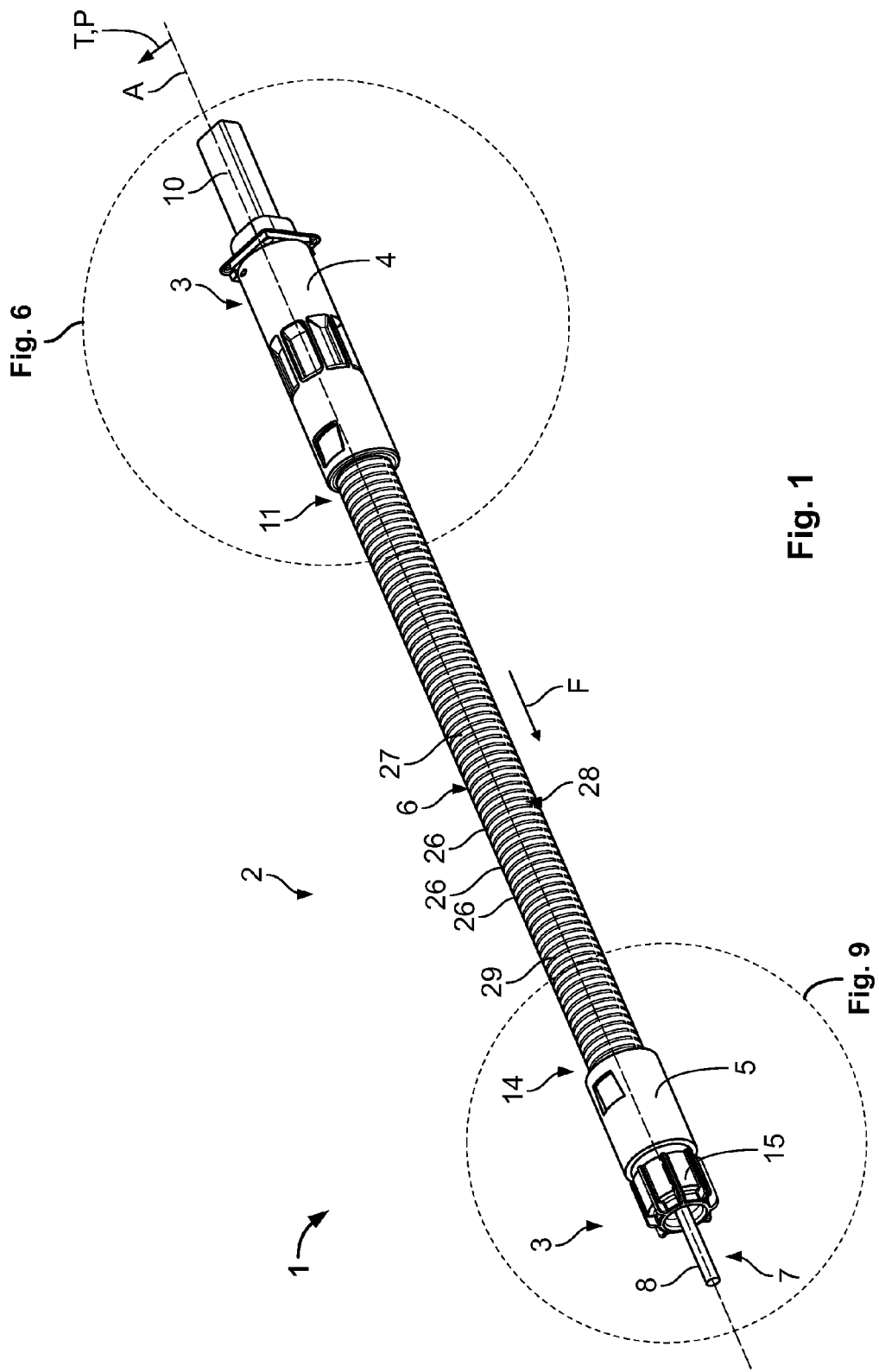
FIG. 1 is a perspective view a connector assembly.

Reference will now be made in detail to embodiments of the invention, examples of which are shown in the accompanying Figures, wherein like reference numerals refer to like elements. In the descriptions of the embodiments provided herein, known functions or configurations are omitted to clearly and concisely describe the invention.

In an embodiment shown in FIG. 1, a connector 1 includes a connector assembly 2 for sealingly coupling a housing 3, such as a connector housing 4 or an adaptor housing 5, on a corrugated tube 6.

The corrugated tube 6 protects a cable 7. The cable 7 can be a data and/or power transmission cable, such as an optical fiber cable, having a data and/or power transmission line 8 which runs essentially along the axial direction A (also referred to as the longitudinal direction) inside the interior 9 of the corrugated tube 6. The transmission line 8 terminates in a cable terminator 10 that connects to a complimentary connector, such as a female connector (not shown).

The corrugated tube 6 protects the cable 7, in particular the transmission line 8 thereof, against harmful environmental impact, such as shock, dirt, strain, moisture or other corrosive substances.

On a first end 11 of the corrugated tube 6, onto which the cable terminator 10 is positioned, the connector housing 4 is sealingly coupled to the corrugated tube 6 by a seal 12 and a fastener 13. Once the cable terminator 10 is connected to the corresponding female connector (not shown), the connector housing 4 can be connected a device (not shown) with the female connector (not shown). In this way, the cable 7 is protected by the connector 1 against harmful environments, while remaining flexibility, in particular in a transverse direction T, including a perpendicular direction P with respect to the axial direction A.

A second end 14 of the corrugated tube 6, opposite to the first end 11, is sealingly coupled, in a similar manner via another pair of the fastener 13 and the seal 12 to the adaptor housing 5. On the adaptor housing 5, a screw cap 15 is mounted in the axial direction A. The screw cap 15, as explained in more detail below, compresses a compression seal 16 around the transmission line 8, thus clamping the cable 7 and providing a strain relief. A tensile force acting along the axial direction A on the cable 7 is thus deflected into the adaptor housing 5, through the corrugated tube 6 and the connector housing 4, to the device (not shown) where the connector housing 4 is mounted.

Figure 2:
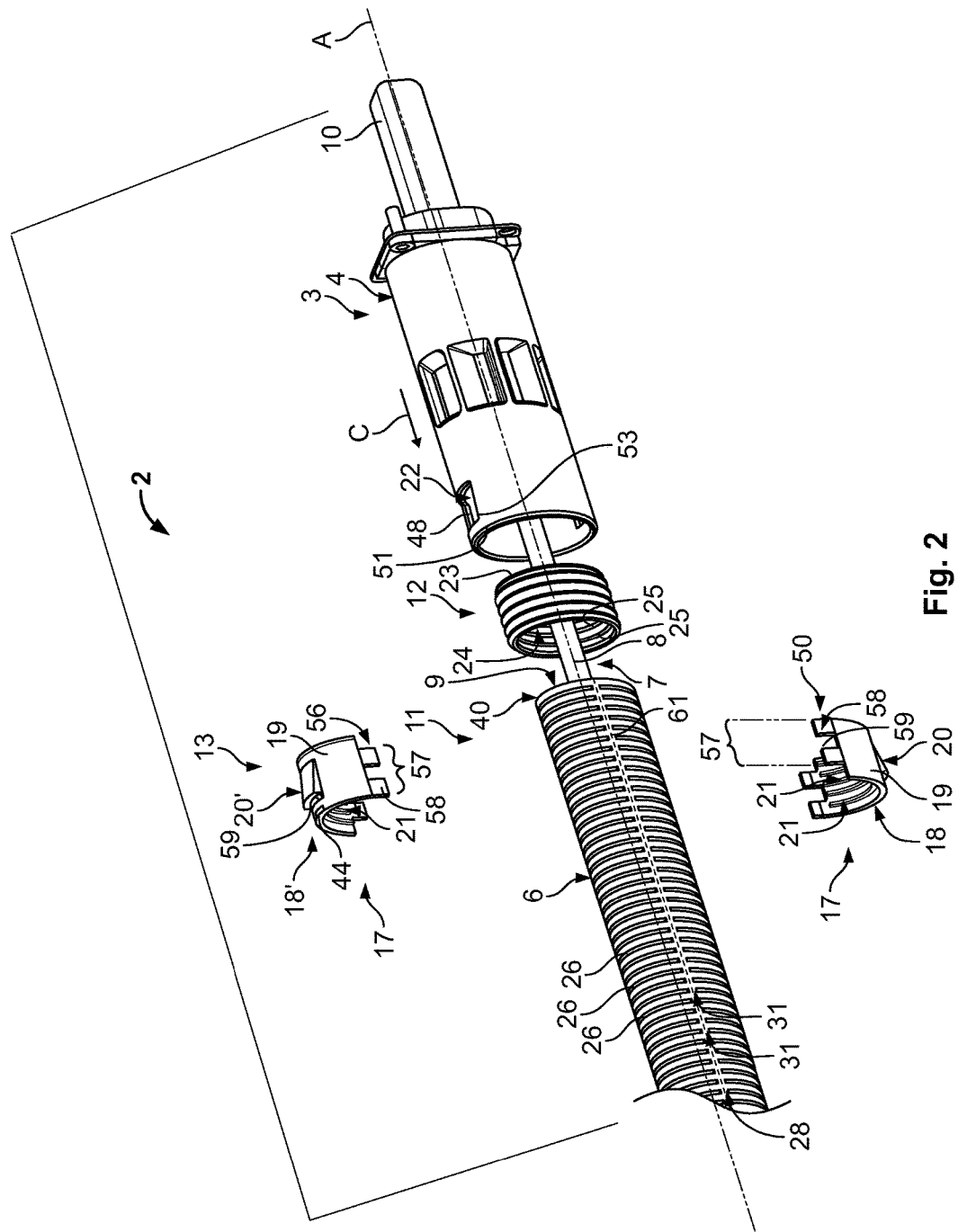
FIG. 2 is an exploded perspective view of the connector assembly.
Figure 4A:
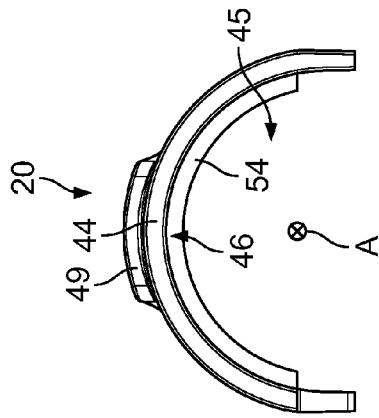
FIG. 4A is a perspective view of an inner surface of a fastener.
Figure 4B:
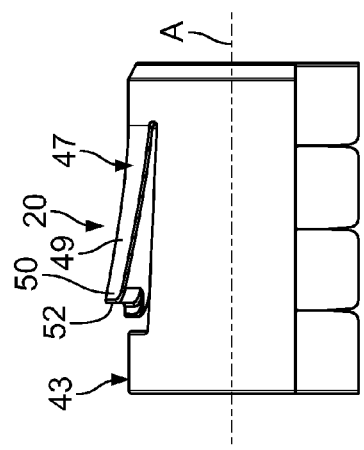
FIG. 4B is an elevation view of a first side of the fastener.
Figure 4C:
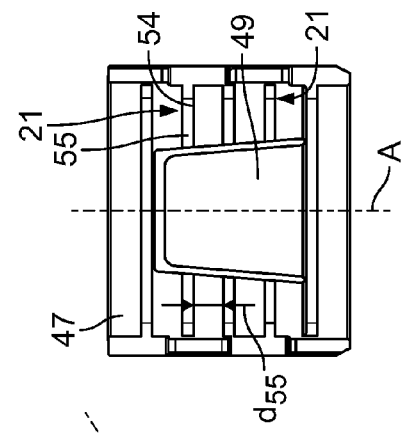
FIG. 4C is an elevation view of a second side of the fastener.
Figure 4F:
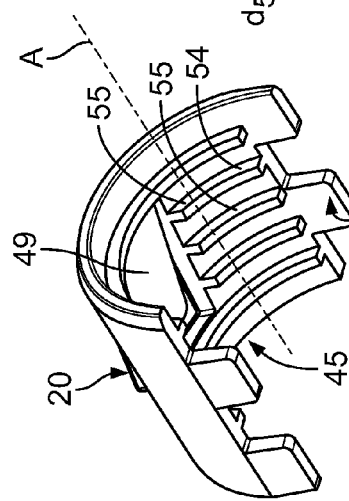
FIG. 4F is a bottom plan view of the inner surface of the fastener.
Figure 4D:
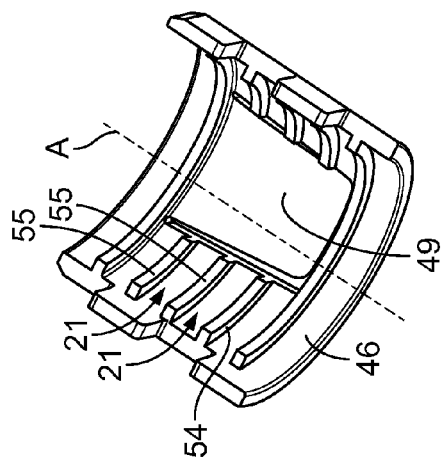
FIG. 4D is a perspective view of an outer surface of the fastener.
Figure 4E:
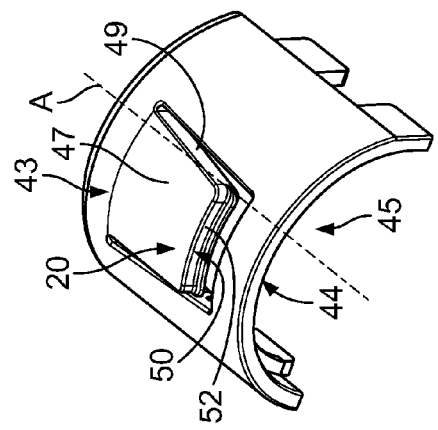
FIG. 4E is a perspective view of the inner surface of the fastener.

In an embodiment shown in FIG. 2, the connector housing 4 is sealingly coupled through the fastener 13 and the seal 12 to the first end 11 of the corrugated tube 6. In an embodiment, which will be explained below in more detail with respect to FIGS. 4A to 4F, the fastener 13 includes a fastener body 17 having a first fastener body 18 and a second fastener body 18'. In an embodiment, the first and second fastener bodies 18, 18' are identically-shape half-shells 19. The fastener body 17 further comprises a coupler 20 for attaching the body 17 to the connector housing 4, and a retaining rib 21 that can be inserted into a corrugation 26 disposed on an outer surface of the corrugated tube 6, for fixing the fastener body 17 in the axial direction A on the corrugated tube 6. Each of the fastener bodies 18, 18' has at least one coupler 20 and a plurality of retaining ribs 21. The connector housing 4 comprises a counter coupler 22 that can be joined with the coupler 20 of the fastener 13 in a manner that fixes the connector housing 4 to the fastener 13.

In the embodiments shown in FIGS. 3A-3C, the seal 12 for sealing the corrugated tube 6 against the housing 3 includes a cylindrically shaped seal body 23 having a centrally extending tube receiving passageway 24 extending in the axial direction A of the seal body 23. The tube receiving passageway 24 receives the first end 11 or the second end 14 of the corrugated tube 6. The seal 12 has a seal retainer 25 that can be inserted into the corrugation 26 of the corrugated tube 6 for fixing the seal 12 in the axial direction A on the corrugated tube 6. The seal 12 will be described in more detail with respect to FIGS. 3A to 3C below.

As shown, for example in the embodiment of FIG. 1, the corrugated tube 6 has a plurality of corrugations 26 disposed on an outer surface 27 of the tube 6, and at least one reinforcing member 28 that stiffens the tube 6 in along the axial direction A. Stiffening the tube 6 in the axial direction A means that the reinforcing member(s) 28 provides strain resistance against a tension force F acting in the axial direction A along the corrugated tube 6, thus preventing elongation of the tube 6 in the axial direction A.

On the outer surface 27, the corrugated tube 6 has a plurality of corrugations 26. In an embodiment, the corrugations 26 are radially extending grooves 29 that run substantially in the perpendicular direction P along the outer surface 27 of the tube 6. In an embodiment, the grooves run in a plane perpendicular to the axial direction A. Adjacent corrugations 26 extend in parallel, and are approximately spaced equally apart from each other at a distance d26.

Figure 8:
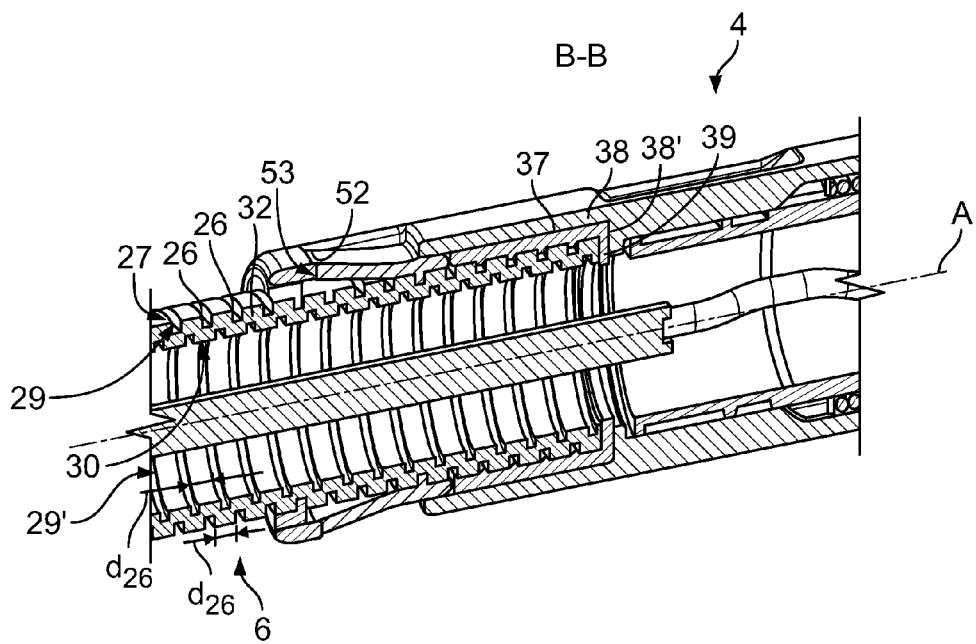
FIG. 8 is a cross sectional view of the connector assembly along intersection line B-B of FIG. 6.
Figure 9:
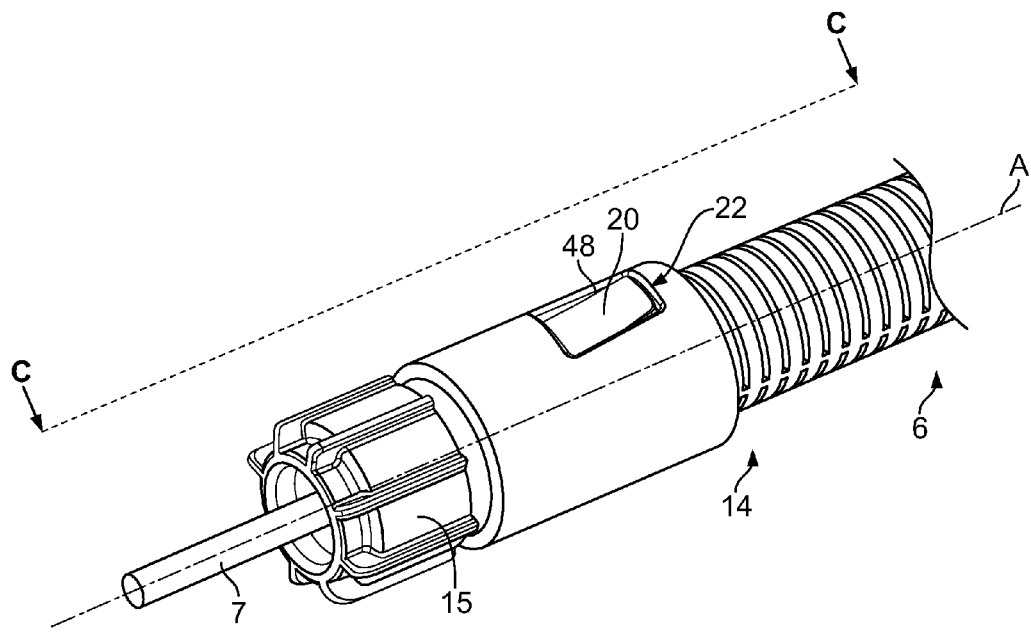
FIG. 9 is an enlarged perspective view of the connector assembly along a left side of FIG. 1.

As shown in an embodiment of FIG. 8, an inner surface 30 of the corrugated tube 6 includes a similar series of parallel grooves 29'. The grooves 29' at the inner surface 30 of the tube 6 are likewise approximately equally spaced apart from each other at the distance d26 and run, in the perpendicular direction P, as parallel, circular grooves 29'. With respect to the axial direction A, the grooves 29 on the outer surface 27 of the tube 6 and the grooves 29' on the inner surface 30 of the tube 26 are offset, providing the corrugated tube 6 with good flexibility in the transverse direction T.

In an embodiment, the reinforcing member 28 extends along the axial direction A of the tube 6, being formed integrally with the tube 6. In another embodiment (not shown), a separate reinforcing member 28, such as a reinforcement strip or bend, may be positioned on the outer surface 27 and/or the inner surface 30 of the tube 6, or may be incorporated into the tube 6 itself.

In the embodiment shown in FIG. 2, the reinforcing member 28 intersects the corrugations 26 on the outer surface 27 of the tube 6. That is, the circular grooves 29 on the outer surface 27 only partially encircle the circumference of the tube 6. At defined positions, each circular groove 29 is intersected at gaps 31, which are regions where the tube body 32 has a complete tube thickness d6 from the outer surface 27 to the inner surface 30 of the tube 6. The gaps 31 of the grooves 29 extend along the axial direction A. This way, a reinforcement ridge 61 is formed that runs along the axial direction A. The reinforcement ridge 61 is a section of the tube 6 having a complete tube thickness d6 at the positions, where the enforcement elements 28 intersect the corrugations 29, i.e. where the gaps 31 are in alignment in the axial direction A.

In the embodiment shown in FIG. 2, only one reinforcing member 28 is shown. However, those of ordinary skill in the art would appreciate that a plurality of reinforcing members, all of which may run along the axial direction A and are, for example evenly distributed around the circumference of the tube 6, can be provided. The reinforcing member 28 prevents elongation of the corrugated tube 6 in the axial direction A, while at the same time maintaining flexibility of the tube in the transverse direction T.

In the embodiments shown in FIGS. 3A-3C, the seal 12 has the seal body 23 with the tube receiving passageway 24 extending in the axial direction A of the seal body 23 for receiving the first end 11 or the second end 14 of the tube 6.

The seal 12 has the plurality of seal retainers 25 that can be inserted into the corrugations 26 of the tube 6, thus fixing the seal 12 in the axial direction A on the tube 6. The seal retainer 25 has arresting protrusions 33 extending into the tube receiving passageway 24. Each arresting protrusion 33 forms a circular retaining rib 34 that extend inward from the inner surface 35 of the seal body 23 into the tube receiving passageway 24.

In an embodiment, the seal retainer 25 includes a series of retaining ribs 34 positioned parallel with each other on the inner surface 35, and are spaced apart from each other at a distance d34, where distance d34 corresponds to the distance d26 between the corrugations 26. The arresting protrusions 33 of the retaining ribs 34, complimentary match the shape of the groove 29 formed on the outer surface 27 of the corrugated tube 6. When the retaining ribs 34 are positioned inside the groove 29 that constitutes the corrugations 26 of the tube 6, the ribs 34 are in abutment with the grooves 29 and thus fix the seal 12 in the axial direction A on the tube 6.

On its outer surface 36, the seal body 23 is provided with outer retaining ribs 37. The outer retaining ribs 37 protrude outward from the outer surface 36, similar to the retaining ribs 34 on the inner surface 35. The outer retaining ribs 37 can be brought into fluid-tight contact with a sealing surface 38 of a housing, such as the connector housing 4 and the adapter housing 5, and may thus form a fluid-tight seal between the corrugated tube 6 and the housing 3. The outer retaining ribs 37 are spaced apart from each other in the axial direction A, and each of the outer retaining ribs forms a sealing barrier that a contaminant must penetrate before reaching the inside of the housing 3.

In an embodiment, the seal body 23 is elastically expandable, to receive either the first or second end 11, 14 of the corrugated tube 6. For example, an diameter of the tube receiving passageway 24 sleeve perpendicular to the axial direction A can be increased when one of the ends 11, 14 of the tube 6 is placed therein. In the embodiment shown in FIG. 3B, an inner diameter w24 of the tube receiving passageway is slightly smaller than an outer diameter w6. Due to the elasticity of the seal body 23, the sleeve 12 may contract and apply a contraction force towards the tube receiving passageway 24 of the seal body 23, this way pressing the seal retainers 25 into the corrugations 26.

The seal body 23 completely surrounds the tube 6 and allows the seal retainers 25 to be equally distributed around the circumference of the corrugated tube 6, in a manner increasing the retention force resulting from the seal retainers 25 inserted in the corrugations 26.

In an embodiment, the seal 12 is provided with a stopper 39 for abutting on the end face 40 of the tube 6 and preventing the seal 12 from being pushed in the axial direction A, further on the corrugated tube 6 than intended. The stopper restricts and limits the insertion of the tube 6 inside the tube receiving passageway 24 by reducing the inner diameter w24 of the tube receiving passageway 24:

In an embodiment, the stopper 39 is positioned on one axial end 41 of the stopper 39 in the form of a collar 42 surrounding the whole circumference of the tube receiving passageway 24. The inner diameter w39 of the stopper 39 is smaller than the inner diameter w24 of the tube receiving passageway 24. The seal body 23 with the collar 42 on one axial end 41 thereof gives the seal 12 the design of a cap which can be placed over the first or second end 11, 14 of the tube 6.

In an embodiment, the seal 12 is integrally formed as one piece with the seal body 23, seal retainers 25, outer retaining ribs 37 and stopper 39. As shown in FIG. 2, when the seal body 23, is placed over the end face 40 of the tube 6, the seal retainers 25 are inserted into the corrugations 26 on the outer surface 27 of the tube, and the collar 42 abuts against the end face 40 of the tube 6. This way, as shown in an embodiment of FIG. 7, the seal 12 covers the first end 11 of the tube in the axial direction A with the stopper 39, as well as perpendicular thereto by the seal body 23. This way, the stopper 39 may seal against a shoulder 38' of the housing 3 in the axial direction A.

As shown in the embodiments of FIGS. 2, 4A-4F, 5 and 7, the half-shell 19 of the fastener body 17 includes the coupler 20 for attaching the fastener body 17 to the housing 3, and the plurality of retaining ribs 21 that can be inserted into a corrugation 26 of the tube 6 for fixing the body 17 in the axial direction A on the tube 6. The coupler 20 is positioned to extend outward from an outer surface 43 of each half-shell 19. In an embodiment, the coupler 20 is positioned on an attachment region 44 of the fastener body 17. The attachment region 44 extends perpendicular to the axial direction A, being a region of the fastener body 17 where the coupler 20 and the retaining ribs 21 are positioned. The coupler 20 and the retaining ribs 21 face in opposite directions with respect to the attachment region 44. That is, the coupler 20 is positioned on the outer surface 43 and faces, in the assembled state, away from the corrugated tube 6 and a tube receiving space 45 of the fastener body 19, whereas the retaining ribs 21 are positioned on the inner surface 46 of the fastener body 17. The coupler 20 and the retaining ribs 21 are arranged at the same position along the axial direction A.

In an embodiment, the coupler 20 is a form-fitting restraint 47 for a joint with the housing 3, such as the connector housing 4 and the adapter housing 5. In an embodiment, the form-fitting restraint 47 is designed for a repeatedly releasable joint with the housing 3. The repeatedly releasable joint includes, on the housing 3, a counter-coupler 22, such as a coupler receiving space 48, into which the coupler 20, such as a latch 49, may be received into in a manner fixing the fastener 17 in the axial direction A on the housing 3.

The coupler 20, such as a latch 49, may comprise an attachment protrusion 50 extending transverse to the axial direction A, so that the attachment protrusion 50 can be brought into abutment with the housing 3, such as the coupler receiving space 48 in the exemplary embodiment shown in the figures.

The coupler 20 can be elastically deflectable in the transverse direction T. In an embodiment shown in FIG. 5, the connector housing 4 is moved in a coupling direction C along the axial axis A over the seal 12 and the fastener 13, the front end 51 of the housing slips over the outer surface 43 of the fastener body 17, until it abuts into the elastically deflectable latch 49 that protrudes transverse to the axial direction A away from the tube receiving space 45 of the fastener body 17. The front end 51 of the housing 3 deflects the latch 49 towards the tube receiving space 45, i.e. into the plane of the attachment region 44 corresponding to the outer surface 43 of the fastener body 17, until the attachment protrusion 50 slips past the front end 51 of the housing 3 and is positioned in the counter-coupler 22, i.e. the receptacle 41 in the housing. There, the latch 49 springs back due to the elastic deflectability into its original position, thus fixing the housing 4 on the fastener 13 against pulling of the fastener 13 in a direction opposite to the coupling direction C. In this position, shown in the embodiments of FIGS. 6 and 8, engagement elements, such as fixation walls 52 of the attachment protrusion 50, come into abutment with a border 53 of the coupler receiving space 48 in the axial direction A.

In order to remove the housing 4 from the fastener 13, the coupler 20 is be pressed in the perpendicular direction P towards the tube receiving space 45, releasing the engagement between the fixation wall 52 of the attachment protrusion 50 and the border 53 of the coupler receiving space 48 in the axial direction A, so the housing 4 may be released against the coupling direction C from the fastener 13.

The retaining rib 21 of the half-shell 17 substantially similar to the seal retainers 25 of the seal 12. The retaining rib 21 includes a locking protrusion 54 that extends into the tube receiving space 45 of the fastener body 16, with the tube receiving space 45 extending in the axial direction A. The locking protrusion 54 is received into a portion of the corrugated tube 6. In an embodiment, the retaining ribs 21 encircle the tube receiving space 45. In an assembled state of the fastener 13, as shown for example in FIG. 5, the tube receiving space 45 is a though-hole in which a part of the tube 6 is completely received. This way, the fastener 13 completely surrounds the tube 6.

The retaining ribs 21 are formed on the inner surface 46 of the fastener body 17 facing into the tube receiving space 45. In an embodiment, the retaining ribs 21 are a plurality of retainer ribs 55. A distance d55 between adjacent retainer ribs 55 corresponds to the distance d26 between the corrugations.

In an embodiment, the fastener body 17, and more specifically, each of the body half-shells 19, is integrally formed with the coupler 20 and the retaining rib 21. Both the coupler 20 and the retaining ribs 21 are positioned in the attachment region 44 of the half-shells 19. In an embodiment, the coupler 20 and the retaining rib 21 are integrally formed with the fastener body 17. When the coupler 20 is the latch 49, the latch 49 intersects the retainer ribs 55. The latch 49 is a section of the attachment region 44 which is partially cut out from the fastener body 17 to form a cantilevered arm. This allows for a very compact design of the fastener 13 by bringing together, in the axial direction A, the coupler 20 for fixing the fastener 13 to the housing 3 and the retaining ribs 21 to be inserted into the corrugations 26 of the tube 6 for fixing the fastener 13 in the axial direction on the corrugated tube 6.

In the embodiments shown in FIGS. 2, 4A-4F, and 5, two of the half-shells 19 depicted in FIGS. 4a to 4f can be assembled together to form the fastener 13. By placing the two half-shells 19 at opposite sides with respect to the corrugated tube 6, they may be assembled together to form the fastener 13 having a substantially ring-like fastener body 17 composed of the two fastener bodies 18, 18'. To ensure a correct assembly of the fastener bodies 18, 18', each includes a corresponding alignment element 56. The alignment element 56 has an alignment face 57 with alignment protrusions 58 and alignment recesses 59 that are complementary to each other. The alignment protrusion 58 from one fastener body 18, 18' may be placed into the corresponding alignment recess 59 of the corresponding fastener body 18, 18'. Thus the assembly of the fastener bodies 18, 18' into the fastener body 17 can be guided. In an assembled state, which can be seen in FIG. 5, the alignment protrusions 58 are placed in corresponding alignment recesses 59 of the other fastener body 18, 18'. The alignment protrusions 58 of both fastener bodies 18, 18' are arranged like interlocking adjacent teeth, in the axial direction, providing a form-fitting connection between the alignment elements 56 of the corresponding fastener bodies 18, 18'.

When assembling the connector 1 using the fastener 13, the seal 12, the corrugated tube 6 and the housing 3, the following steps are performed: First, the cable 7 is moved, with the cable terminator 10 first, through the corrugated tube 6 until the cable terminator 10, introduced in second end 14 of the tube 6, exits from the first end 11 of the tube 6. Next, the seal 12 is placed in a coupling direction C, over the cable terminal 10, receiving the cable 7 in the tube receiving passageway 24. Subsequently, the seal 12 is placed on the first end 11 of the tube 6 until the seal 12 covers the first end 11 of the tube, such that the stop 39 is in abutment with the end face 40 of the tube 6. The seal body 23 covers the first end 11 of the tube, wherein the seal retainers 25 are inserted into the corrugations 26 on the outer surface 27 of the tube 6, this way fixing the seal 12 in the axial direction A on the tube 6.

Figure 5:
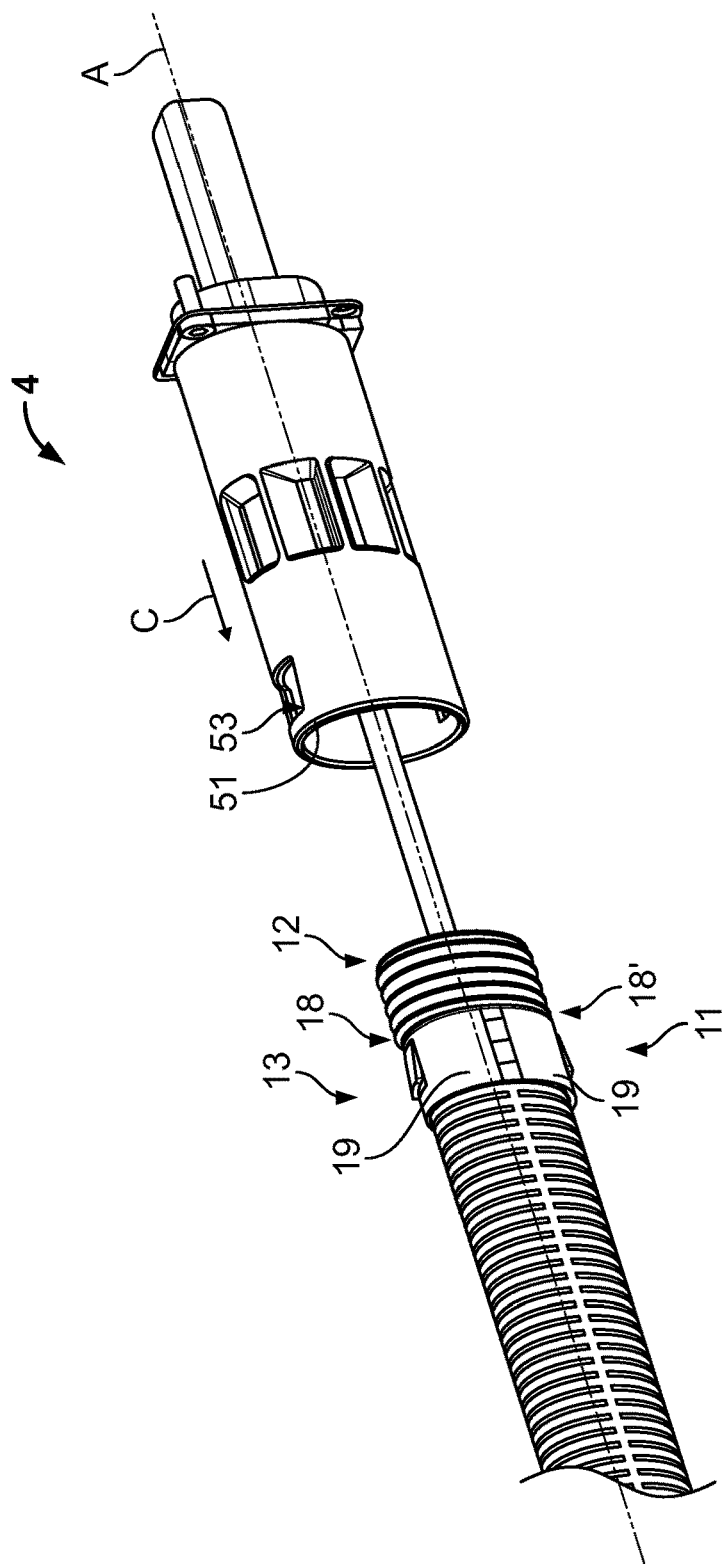
FIG. 5 is a partially exploded view of the connector assembly prior to attaching a connector housing to the fastener.
Figure 7:
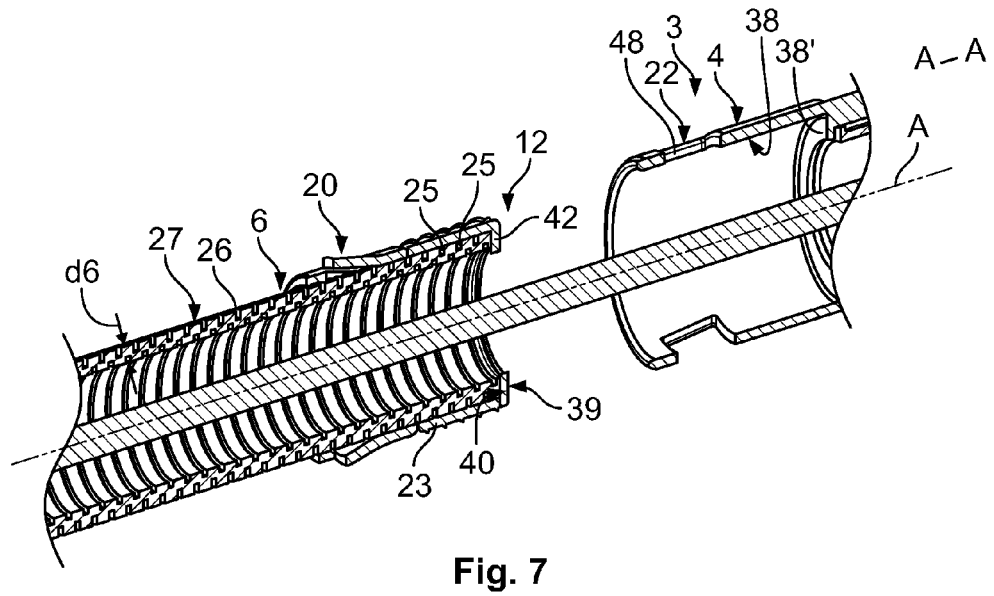
FIG. 7 is a cross-sectional view of the connector assembly along intersection line A-A in FIG. 5.

Next, the fastener 13 is mounted adjacent to the seal 12 of the first end 11 of the tube 6 by assembling the two fastener bodies 18, 18' such that the alignment elements 56 are matched by placing the alignment protrusions 58 of one fastener body 18, 18' into the corresponding alignment recesses 59 of the other fastener body 18, 18'. In the course of assembly, the retaining ribs 21 are inserted into corrugations 26 on the outer surface 27 of the tube, fixing the body 17 of the fastener 13 in the axial direction A on the tube 6. This intermediate state of assembling is shown in FIGS. 5 and 7.

Figure 6:
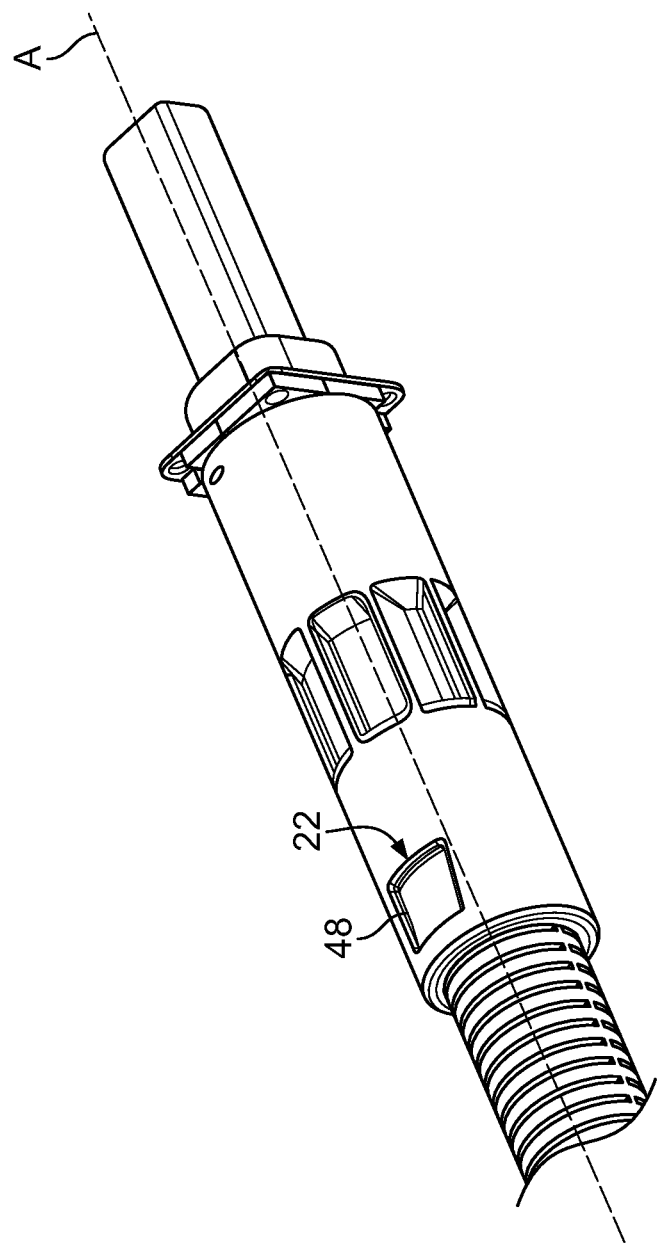
FIG. 6 is an enlarged perspective view of the connector assembly along a right side of FIG. 1.

Next, the connector housing 4 is moved in the coupling direction C, over the seal 12 and the fastener 13, as explained above, until the coupler 20 of the fastener 13 is arranged in engagement with the corresponding counter-coupler 22 of the housing 4, which final assembling position is shown in FIGS. 6 and 8.

The assembly of the second end 14 of the corrugated tube 6 is performed similarly. In an embodiment, on the second end 14 of the corrugated tube 6, an adapter housing 5 is sealingly coupled with the corrugated tube 6. The adapter housing 5 serves to clamp the cable 7. To do this, the screw cap 15 is screwed along the axial direction A onto the adapter housing 5. The compression seal 16, having an cable receiving passageway 60, is placed such that the cable transmission line 8 is received in the cable receiving passageway 60 and, upon screwing the screw cap 15 on the adapter housing 5, the screw cap 15 compresses the compression seal 16, thereby clamping the transmission line 8 in the cable receiving passageway 60.

Figure 10:
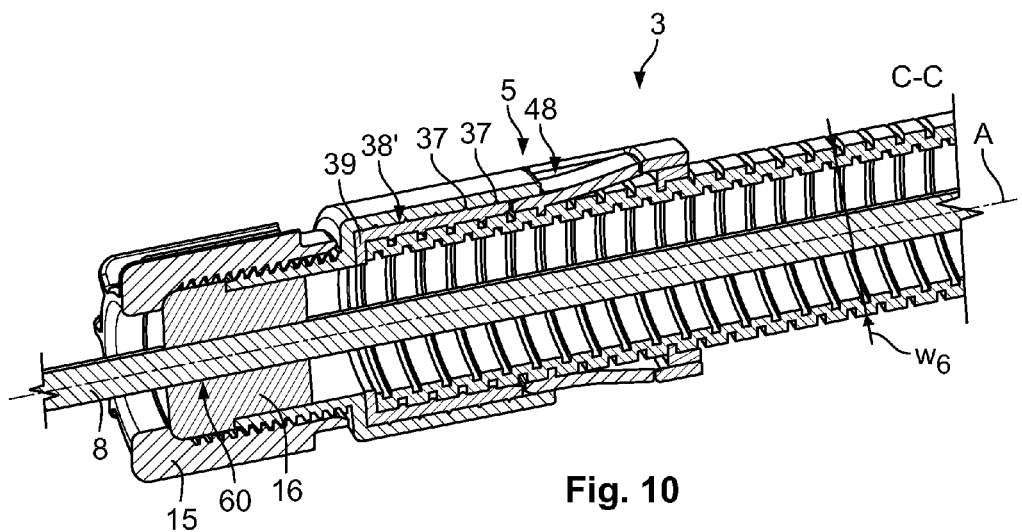
FIG. 10 is a cross-sectional view of the connector assembly along intersection line C-C of FIG. 9.

In this assembled state, shown for example in FIGS. 8 and 10, the seal 12 seals the corrugated tube 6 against the housing 3, whereas the fastener 12 secures the housing 3 on the corrugated tube 6 because the coupler 20 of the fastener 13 is fixed, in the axial direction A, to the housing, and the retaining ribs 21 of the fastener 13 are fixed in the corrugations 26 of the corrugated tube 6 in the axial direction A as well.

The seal 12 seals against the housing 3 in the axial direction A by a fluid-tight sealing between the stopper 39 of the seal body 23, which is pressed against a sealing shoulder 38' in the housing. In the perpendicular direction P, the seal 12 is fluid-tight by pressing the outer retaining rib 37 against the sealing surface 38 of the housing 4.

Although exemplary embodiments have been shown and described, those of ordinary skill in the art would appreciate that changes may be made in these exemplary embodiments without departing from the principles and spirit of the disclosure, the scope of which is defined by the claims and their equivalents.

What is claimed is:

1. A connector assembly comprising:
   a tube having an outer surface with a plurality of corrugations;
   a seal positioned on an end of the tube and having a plurality of inner retaining ribs on an inner surface of the seal engaging the corrugations and fixing the seal to the tube;
   a fastener separate from the seal and positioned adjacent the seal on the end of the tube, the fastener having a fastener body including two half-shell fastener bodies each having complementary alignment elements that are interlocked when the half-shell fastener bodies are connected together, each half-shell fastener body having a coupler elastically deflectable with respect to the fastener body and a plurality of retaining ribs positioned on an inner surface of the fastener body, the retaining ribs engaging the corrugations and fixing the fastener body to the tube; and,
   a housing receiving the tube with the seal and the fastener positioned on the end, the housing having a counter-coupler releasably engaging the coupler.

2. The connector assembly of claim 1, wherein the coupler is a releasable form-fitting restraint.

3. The connector assembly of claim 1, wherein the coupler has a locking protrusion.

4. The connector assembly of claim 1, wherein the fastener comprises a tube receiving space into which the retaining ribs extend.

5. The connector assembly of claim 4, wherein the plurality of retaining ribs are spaced apart from each other along a longitudinal axis of the fastener.

6. The connector assembly of claim 1, wherein the seal comprises a seal body with a tube receiving passageway therethrough.

7. The connector assembly of claim 6, wherein the plurality of inner retaining ribs of the seal is one or more arresting protrusions extending into the tube receiving passageway.

8. The connector assembly of claim 6, wherein the seal body has an outer surface with one or more outer retaining ribs.

9. The connector assembly of claim 6, wherein a stopper flange is positioned on an end of the seal body, the stopper flange extending into the tube receiving passageway.

10. The connector assembly of claim 1, wherein the inner retaining ribs of the seal are spaced apart from each other along a longitudinal axis.

11. The connector assembly of claim 1, wherein the outer surface of the tube has a reinforcing member.

12. The connector assembly of claim 11, wherein the reinforcing member extends longitudinally along the tube.

13. The connector assembly of claim 11, wherein the reinforcing member intersects the corrugations.

14. The connector assembly of claim 11, wherein the reinforcing member has a longitudinally extending reinforcement ridge.

15. The connector assembly of claim 14, wherein the corrugations are circumferential grooves that are interrupted by a longitudinally extending gap.

16. The connector assembly of claim 15, wherein the reinforcement ridge is positioned in the gap.

17. The connector assembly of claim 11, wherein the reinforcing member is integrally formed with the tube.

18. The connector assembly of claim 1, wherein each fastener body has a first end and an opposite second end extending along an axial direction of the tube, the fastener body has a portion positioned between both the first end of the fastener body and the coupler and the second end of the fastener body and the coupler.

* * * * *